Aug. 12, 1952     H. GUSTAFSON     2,606,364
IMPLEMENT FOR BUTTERING CORN
Filed Oct. 21, 1949
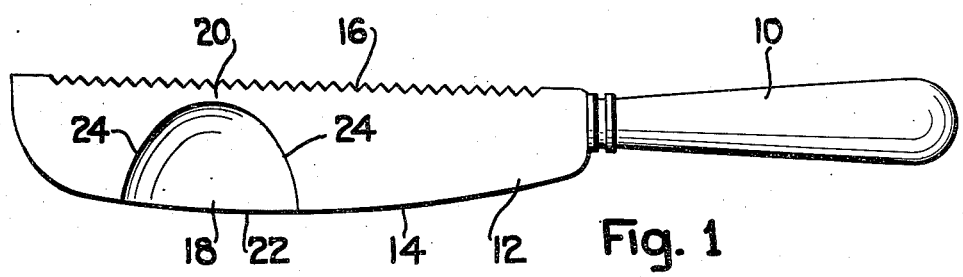
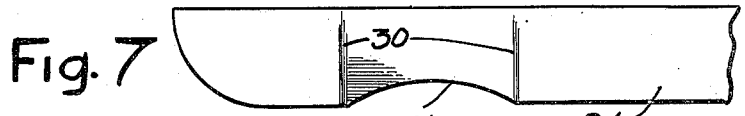
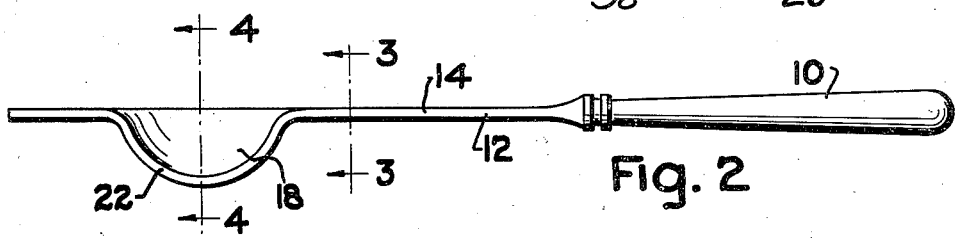
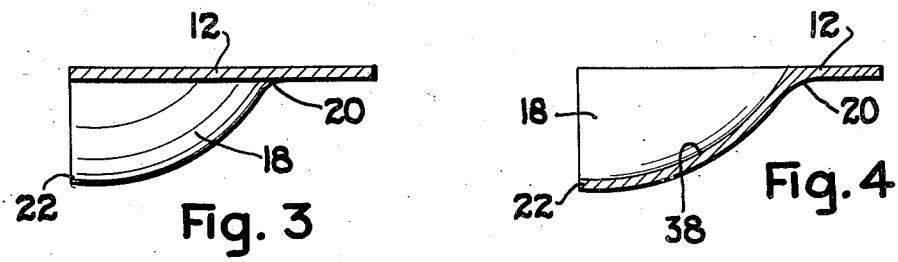
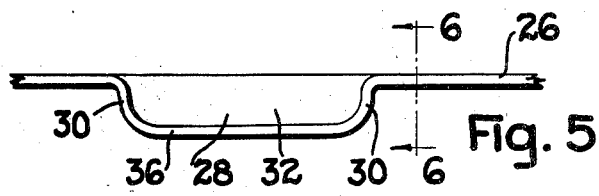
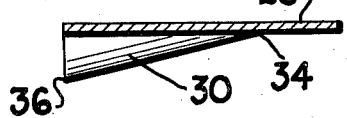
INVENTOR.
HENRY GUSTAFSON
BY
Charles R. Fay, atty.

Patented Aug. 12, 1952

2,606,364

UNITED STATES PATENT OFFICE 2,606,364

IMPLEMENT FOR BUTTERING CORN

Henry Gustafson, Worcester, Mass.

Application October 21, 1949, Serial No. 122,733

1 Claim. (Cl. 30—149)

This invention relates to new and improved flatware partcularly adapted to the purpose of buttering corn in an easy, efficient manner preventing waste of the butter.

The principal object of the invention resides in the provision of a hand manipulated implement of the class described comprising a handle and a blade element, said blade being provided with a concave scoop-like portion extending to one side thereof only, for the purpose of keeping the butter in close engagement with the surface of an ear of corn to be buttered, said concave portion also acting as a scoop or spoon portion by which the butter may be cut off or scooped up from a larger piece, and then supplied directly to the ear of corn, said concave portion holding the butter, applying it to the ear, and preventing the butter from escaping uselessly as it melts due to the heat of the corn, as when a common knife blade is used for the purpose.

Other objects and advantages of the invention will appear hereinafter.

Reference is to be had to the accompanying drawings in which

Fig. 1 is a view in elevation of a device according to the present invention;

Fig. 2 is an edge view thereof;

Fig. 3 is an enlarged section on line 3—3 of Fig. 2;

Fig. 4 is an enlarged section on line 4—4 of Fig. 2;

Fig. 5 is an enlarged edge view of a modification, parts being broken away;

Fig. 6 is a section on line 6—6 of Fig. 5; and

Fig. 7 is a plan view of the modified device.

The present invention comprises a knife-like implement including a handle 10 to which is secured or made integrally therewith of blade 12 in the general form of a knife having an edge 14 which may be sharp or relatively dull as desired. The edge 14 may be used for cutting or chopping in more or less the ordinary way. The back edge of the blade 12 as at 16 is serrated for the primary purpose of cleaning the kernels from the ears of corn, but this serrated edge is not necessary to the invention and could, if desired, be omitted.

The main feature of the present invention resides in a concave portion generally indicated at 18, this portion being located so as to taper from a point 20 adjacent the rear edge of the blade at 16 and gradually descending or enlarging as shown in Figs. 3 and 4 to the edge portion of the knife blade as at 22, said edge 22 being either sharp or blunt as desired, generally preferably being sharpened to the same degree as the edge 14. The concave portion 18 is in the form of a scoop and more or less generally accommodates itself to the cylindrical tapering shape of an ear of corn, and it will be clearly seen that substantially any size of ear may be accommodated by this scoop-like portion because of the diverging edge portions as at 24.

In the use of this device, the edge 22 is used to scoop up the butter which is then held in the scoop and the implement being turned upside down, it may be run over the surface of the ear of corn, distributing the butter evenly thereon without useless loss due to melting and dripping of the butter in contact with the hot corn, and preventing escape of the butter chunk as often happens with a common knife.

A modification of the invention is illustrated in Figs. 5, 6 and 7 wherein the blade 26 is provided with a different shaped scoop 28, the same having straight side walls 30 merging into a flat bottom 32 which tapers from a point 34 to the curved cutting edge 36, see Fig. 7. In this form of the device, the shape of the scoop is such as to fail to fit the surface of an ear of corn quite so well, but nevertheless, it has been found that such a curved edge as 36 also butters the corn much better than an ordinary knife blade because the butter will be held in the scoop for general contact with the ear of corn even though this scoop is not shaped thereto.

It is pointed out that the concave shape of the bottom of the scoop in Figs. 3 and 4 provides a kind of pocket 38 in which the butter is retained in somewhat the same manner as in a spoon.

This particular device may be made in many ways and of many different materials following the general practice in the flatware industry. For instance, the blade may be of steel and the handle of solid or plated silver, bone, wood, ivory, etc., or the entire device may be blanked out of sheet metal, or it may be molded of plastic materials or the like.

Having thus described my invention and the advantages thereof, I do not wish to be limited to the details herein disclosed otherwise than as set forth in the claim, but what I claim is:

A knife having a straight blade and a cutting edge, a scoop-like depression in said blade starting at said cutting edge as a concave depression at right angles to the blade, said depression being deepest at said cutting edge and gradually decreasing and merging into the blade at a point remote from the said cutting edge.

HENRY GUSTAFSON.

REFERENCES CITED

The following references are of record in the file of this patent:

UNITED STATES PATENTS

| Number | Name | Date |
|---|---|---|
| D. 25,047 | Collins | Jan. 14, 1896 |
| 174,241 | Higgins | Feb. 29, 1876 |
| 421,995 | Von Reibnitz | Feb. 25, 1890 |
| 669,884 | Stoddard | Mar. 12, 1901 |

FOREIGN PATENTS

| Number | Country | Date |
|---|---|---|
| 2,527 | Great Britain | Feb. 1, 1884 |